US012662976B2

(12) United States Patent
Valverde Pereira et al.

(10) Patent No.: US 12,662,976 B2
(45) Date of Patent: Jun. 23, 2026

(54) PROFILED COVER PLATE FOR A PISTON

(71) Applicant: Cummins Inc., Columbus, IN (US)

(72) Inventors: Marcos Manoel Valverde Pereira, Columbus, IN (US); Abhay Kumar Sahu, Pune (IN); Swati Ashvinkumar Veerbhadra, Pune (IN)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/544,404

(22) Filed: Dec. 18, 2023

(65) Prior Publication Data

US 2025/0198362 A1 Jun. 19, 2025

(51) Int. Cl.
*F02F 3/20* (2006.01)
*F02F 3/22* (2006.01)
*F02F 3/28* (2006.01)

(52) U.S. Cl.
CPC . *F02F 3/28* (2013.01); *F02F 3/22* (2013.01)

(58) Field of Classification Search
CPC ...... F02F 3/22; F02F 3/003; F02F 2003/0061; F02F 3/00; F16J 1/001; F16J 1/005; F16J 1/006; F16J 1/008; F16J 1/08; F16J 1/09
USPC .............. 123/41.35, 193.6; 92/172, 186, 189
See application file for complete search history.

(56) References Cited

U.S. PATENT DOCUMENTS 5,052,280 A 10/1991 Kopf et al.
5,144,923 A 9/1992 Leites et al.
5,357,920 A 10/1994 Kemnitz et al.
6,659,062 B1 * 12/2003 Issler ........................ F02F 3/22 123/193.6
7,162,990 B1 1/2007 Ioja et al.
7,762,227 B2 7/2010 Sadowski et al.
8,347,842 B2 1/2013 Sadowski et al.
9,228,480 B2 1/2016 Wirkkala, II et al.
10,612,489 B2 4/2020 Jung et al.
2007/0074695 A1 4/2007 Gildemeister et al.
2013/0025550 A1 1/2013 Ißler et al.
2015/0167584 A1 6/2015 Ullrich
2015/0354435 A1 * 12/2015 Wirkkala .................. F01P 3/10 123/41.35

(Continued)

FOREIGN PATENT DOCUMENTS

DE 19930630 C1 * 10/2000 ................ F02F 3/22
DE 10158607 A1 * 6/2003 ................ F02F 3/22
DE 10358121 A1 * 11/2004 ................ F02F 3/22

*Primary Examiner* — George C Jin
*Assistant Examiner* — Teuta B Holbrook
(74) *Attorney, Agent, or Firm* — Taft Stettinius & Hollister LLP

(57) ABSTRACT

An internal combustion engine piston includes a crown defining an annular cavity between an inner wall and an outer wall. The annular cavity includes an opening opposite a top wall and at least partially defines a cooling gallery. A cover plate is assembled with the annular cavity and the piston crown to form a lower boundary of the cooling gallery and thereby enclose the cooling gallery within the piston crown. The cover plate includes a plurality of crests separated by a plurality of troughs wherein the crests and troughs are arranged to create a variable volume profile of the cooling gallery. The variable volume profile of the cooling gallery can increase or decrease annularly around the piston based on a cross-sectional shape of the cover plate. Optionally, the cover plate includes one or more inlets or outlets for exchanging fluid in the cooling gallery.

12 Claims, 15 Drawing Sheets

(56) References Cited

U.S. PATENT DOCUMENTS

2022/0307444 A1 9/2022 Jung et al.

* cited by examiner

PROFILED COVER PLATE FOR A PISTON

TECHNICAL FIELD

The present application relates generally to a profiled cover plate for a cooling gallery of a piston of an internal combustion engine.

BACKGROUND

Internal combustion engine typically has pistons. While in service, pistons used in internal combustion engines are exposed to extremely hot operating temperatures. To reduce the temperature of piston components, a cooling gallery may be provided within the piston crown. In some pistons the cooling gallery are internally generated during piston foundry, like aluminum piston, but in some cases, the gallery needs to be enclosed using a cover plate, like in steel pistons. The cooling gallery may be formed by an interior volume located within the piston crown and may be covered with a cover plate that is typically located along a lower surface of the piston crown. The cooling gallery and cover plate generally define a chamber or channel having a permanently defined volume.

Due to severe thermal stresses generated by the hot combustion chamber temperatures, it may be necessary to cool the piston crown during engine operation. As one example, the piston crown for internal combustion engines may be cooled via an oil jet directed into the cooling gallery. The oil flows into the cooling gallery through an inlet aperture in the piston cooling gallery, and the reciprocating motion of the piston during engine operation generally moves the oil up and down within the cooling gallery. Accordingly, at least part of the heat of the piston crown portion is transferred to the oil.

The heated oil typically exits the cooling gallery through an exit aperture in the piston, while fresh oil can be supplied to the cooling gallery through the inlet aperture. The cooling gallery design is important to optimize the heat transfer from piston to oil, so reducing the piston temperature and increasing piston resistance and life.

Therefore, further contributions in this area of technology are needed to improve the durability of the piston crown of the engine.

SUMMARY

Internal combustion engines include variable profile cooling galleries in the piston due to the elevated combustion pressure and temperature within the combustion chamber. Moreover, to improve engine performance it has become increasingly desirable to operate engines at even higher combustion pressures and temperatures. Additionally, variable profile cooling galleries in the pistons may vary depending on the intended operating conditions of a particular engine.

Pistons may have constant or variable gallery profiles. The variable profile cooling galleries in the piston have areas that have a high or larger cross-sectional area and areas that have a low or smaller cross-sectional area due to the unique cover plate positioned in and/or assembled with an annular cavity in the piston to form a cooling gallery. The cover plate circumferentially extends along the annular cavity to form, in part, the oil cooling gallery. The cover plate may extend outwardly from the annular cavity or the cover plate may extend inwardly to the annular cavity thereby altering a fixed volume of the cooling gallery. Accordingly, the cover plate may operate to displace the fluid, e.g., oil or other coolant, flowing in the cooling gallery. The cover plate may also operate to allow a larger or smaller cross sectional area of the cooling gallery. The cover plate may also operate to allow a variable cross sectional area of the cooling gallery. As such the unique shape and placement of the cover plate in the annular cavity can optimize the oil cooling gallery heat exchange efficiency of the cooling gallery reducing piston temperature hence increasing piston life.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

Figure 1:
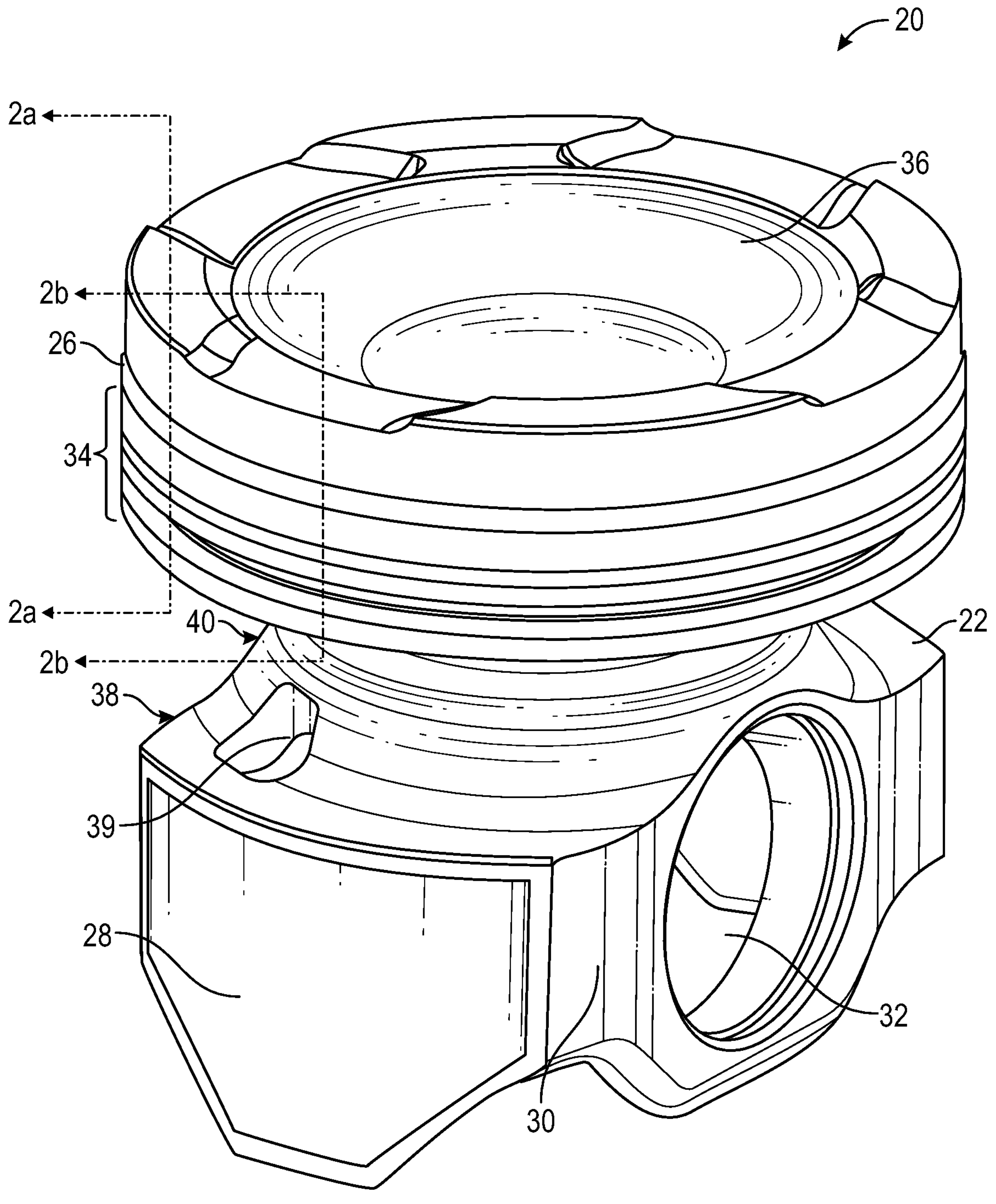
FIG. 1 is a top perspective view of a piston having a cover plate positioned in a cooling gallery of a piston crown according to one implementation of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Turning now to the present application with reference to FIG. 1, an exemplary piston assembly 20 is provided having a piston 22. The piston 22 can be made of aluminum, steel, iron, or other metals or combinations of metals and alloys. The piston 22 can be an articulated piston, a monotherm piston, or another type of piston that requires one or more pieces to enclose the piston cooling gallery.

The piston assembly 20, in some embodiments, may include an insert (not illustrated). The piston 22 may include a piston crown 26 and a piston skirt 28. The piston crown 26 and skirt 28 may be secured together in a manner that is convenient. The piston skirt 28 generally supports the piston crown 26 during engine operation, e.g., by interfacing with surfaces of an engine bore (not shown) to stabilize the piston assembly 20 during reciprocal motion within the bore. The piston skirt 28 may include piston pin bosses 30 extending axially downward relative to a longitudinal axis A from the piston skirt 28. The piston pin bosses 30 may be formed with an aperture 32 for receiving a piston pin (not shown). For instance, a piston pin may be inserted through the aperture 32 in the piston pin bosses 30, thereby generally securing the piston skirt 28 to a connecting rod (not shown). The piston pin bosses 30 may generally define an open area between the piston pin bosses, e.g., for receiving the connecting rod.

The piston crown 26 may include an annular ring belt portion 34 extending axially in the direction of the piston skirt 28. The ring belt portion 34 may include a plurality of ring grooves for receiving piston rings (not shown). The piston crown 26 may include a combustion bowl 36 on an upper surface of the piston crown 26. A panel area 38 may be located between the piston crown 26 and piston skirt 28 and define an annular recess 40. The annular recess 40 may be located between ring belt portion 34 and the piston skirt 28. The panel area 38 may include one or more apertures 39 for receiving oil jet flow from a nozzle (not shown). According to another variation, the piston crown 26 and skirt 28 may be secured via respective radially inner and outer mating surfaces (not shown) of the piston crown 26 abutting corresponding radially inner and outer mating surfaces (not shown) of the piston skirt 28.

The components of the piston crown 26 and piston skirt 28 may be formed from any materials that are compatible for use in an internal combustion engine. In one example, the components of the piston crown 26 and skirt 28 may be formed of a same material, e.g., steel. In another example, the piston crown 26 may be formed of a different material than the piston skirt 28. As such, the material used for the piston crown 26 may include different mechanical properties, e.g., toughness, tensile strength, thermal elasticity, than the piston skirt 28. Any materials or combination may be employed for the piston crown 26 and skirt 28. Merely as examples, the piston crown 26 and/or skirt 28 may be formed of a steel material, cast iron, aluminum material, composite, or powdered metal. The piston crown 26 and skirt 28 may also be formed in different processes, e.g., the piston crown 26 may be a single cast piece, while the piston skirt 28 may be forged. Any material and/or forming combination may be employed that is convenient.

The piston 22, and more particularly the piston crown 26, may generally form a circumferentially extending annular cavity 42 defining at least part of a cooling gallery 44. The annular cavity 42 may be formed into the underside of the piston crown 26 adjacent to the ring belt portion 34. The annular cavity 42 together with a bottom portion may define the cooling gallery 44 which may generally facilitate cooling of the piston 22. The cooling gallery 44 may generally extend about a perimeter of the piston crown. As illustrated in FIG. 1, the cooling gallery 44 may be defined in part by the ring belt portion 34 and the combustion bowl 36. For example, the ring belt portion 34 may define an annular outer wall 46, the combustion bowl 36 may define a radially inner wall 48, and a top wall 50 may extend between the outer and inner wall 46, 48. The outer wall 46 may terminate at a first end 52, and the inner wall 48 may terminate at a second end 54. Additionally or alternatively, the outer wall 46 and/or inner wall 48 may further be defined by the piston skirt 28. As one example, the panel area 38 of the piston skirt 28 may define at least a portion of the inner wall 48 of the cooling gallery 44, e.g., such that the inner wall 48 is comprised of the combustion bowl 36 and skirt 28. As another example, the cooling gallery 44 may be defined by respective radially inner and outer mating surfaces (not shown) of the piston crown 26 and skirt 28. For instance, the radially outer mating surfaces of the piston crown 26 and skirt 28 may define the outer wall 46 and the radially inner mating surfaces of the piston crown 26 and skirt 28 may define the inner wall 48.

The first and second ends 52, 54 of the outer and inner walls 46, 48 may be configured to secure a cover plate 56 to the piston crown 26, as will be described in more detail below. For instance, the first and/or second end 52, 54 may include a radial step or shelf for supporting a complementary or sealing edge of the cover plate 56. Additionally or alternatively, the ends 52, 54 may include a notch or collar for insertably receiving an edge of the cover plate 56. As a further example, the ends 52, 54 may include bores aligning with corresponding bores on the cover plate 56 for receiving fasteners. Moreover, the first and second ends 52, 54 may prevent circumferential rotation of the cover plate 56 during reciprocating motion of the piston 22. The first and second ends 52, 54 define an opening 53 that spans between the first and second ends 52, 54. The opening 53 is positioned opposite the top wall 50.

The cooling gallery 44 may include an interior volume V located within the piston crown 26. The cooling gallery 44 is in fluid communication with one or more nozzles (not shown) for directing fluid, e.g., engine oil, into the cooling gallery 44. This fluid will cool the inside walls 46, 48, 50 of the cooling gallery 44 as a result of the rapid reciprocating motion typical of pistons for internal combustion engines during operation. The fluid that is introduced into the cooling gallery 44 may be permitted to escape through the aperture 32 for drainage backing into the crank case of the engine (not shown). The fluid may also be able to drain towards the piston skirt 28 around the outer surfaces or perimeter of the piston 22, at least to the extent allowed by the cover plate 56.

The annular recess 40 may be formed by the panel area 38 and may generally be located between the ring belt 34 and the piston skirt 28. The cooling gallery 44 may be in fluid communication with the annular recess 40 via one or more cover plate apertures 160, 260. As such, the annular recess 40 and cooling gallery 44 may both accumulate fluid during operation of the piston 22 within the internal combustion engine. Therefore, both the cooling gallery 44 and annular recess 40 may include fluid that cools the piston.

According to one implementation, the piston 22 may include a bottom cover plate 56 enclosing the annular cavity 42 within the piston crown 26 thereby defining the cooling gallery 44. The cover plate 56 may be secured to the first and second ends 52, 54 of the outer and inner wall 46, 48, respectively. The cover plate 56 may be generally be accessible after assembly of the piston crown 26 and skirt 28 to allow insertion, assembly and/or removal of the cover plate 56 from the piston 22.

Figure 2A:
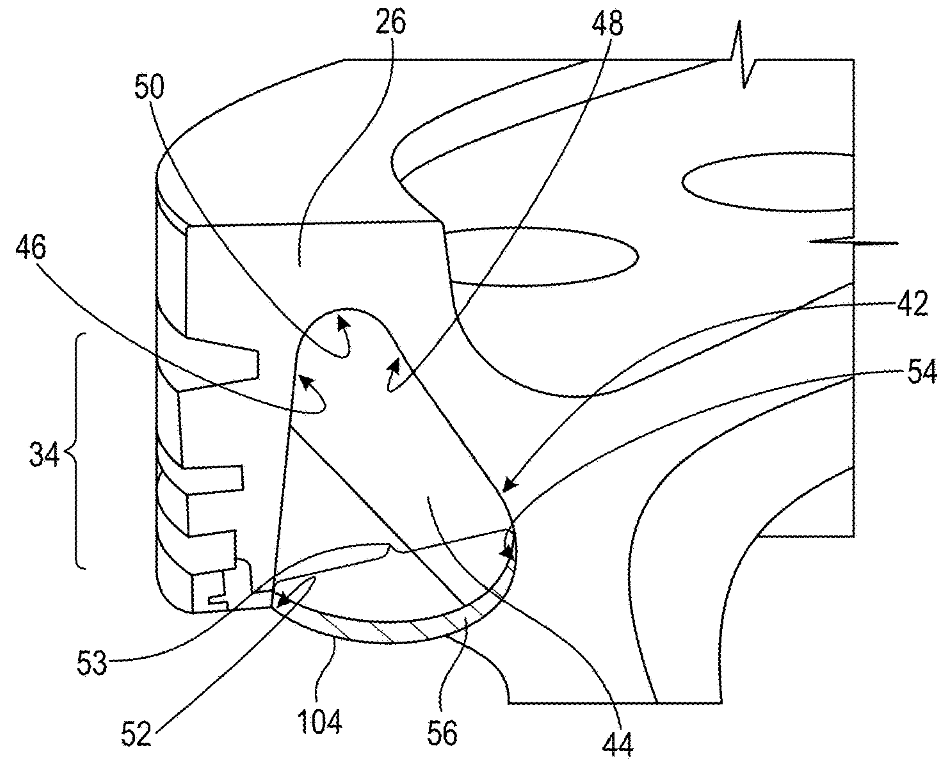
FIG. 2*a* is a first partial cross-sectional view of the piston and the cover plate illustrated in FIG. 1.
Figure 2B:
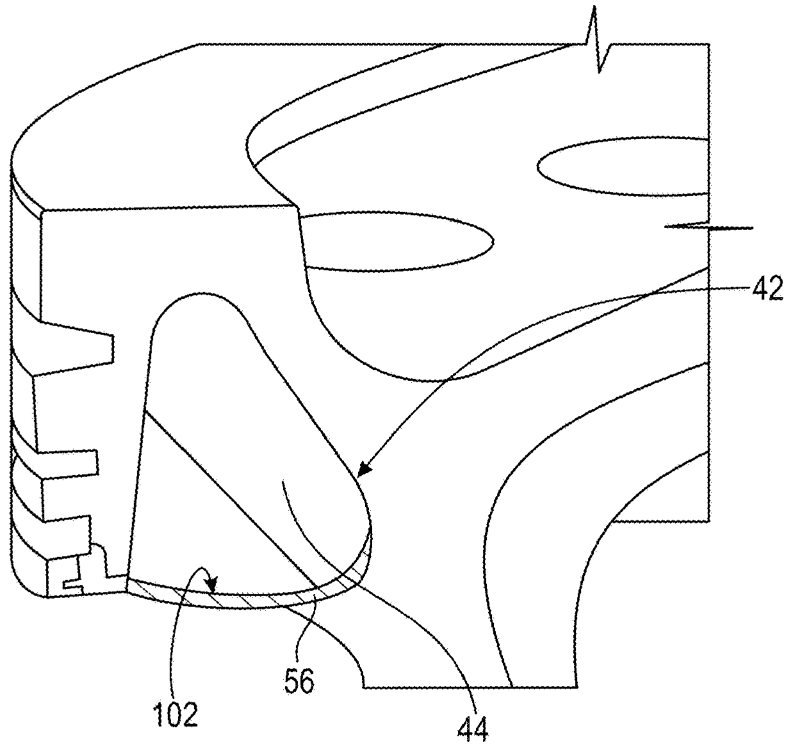
FIG. 2*b* is a second partial cross-sectional view of the piston and the cover plate illustrated in FIG. 1.
Figure 3:
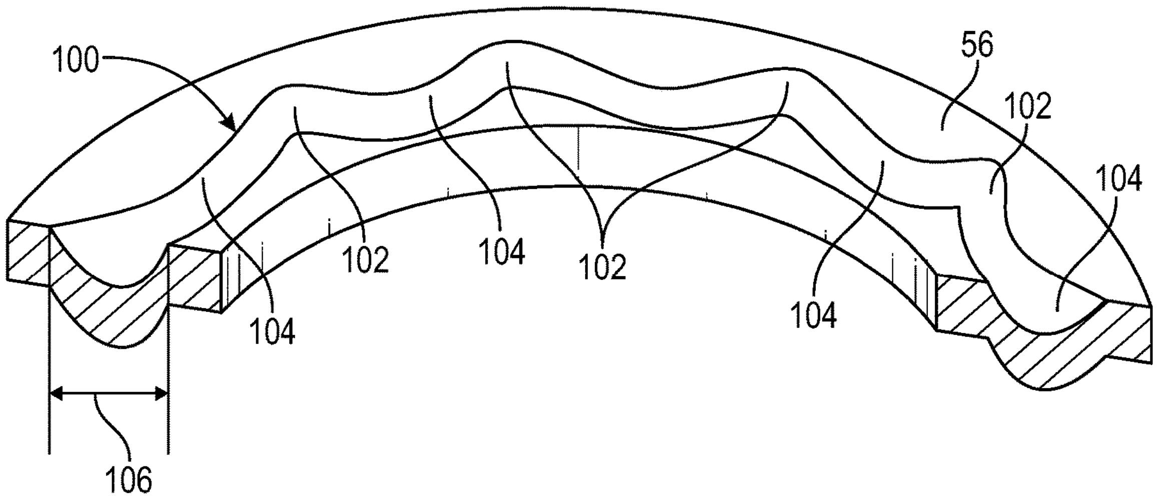
FIG. 3 is a cross-sectional perspective view of the cover plate illustrated in FIGS. 1 and 2.

Illustrated in FIGS. 2*a*, 2*b*, and 3 is one embodiment of the cover plate 56 that forms a lower boundary of the cooling gallery 44, thereby enclosing the cooling gallery 44 within the piston crown 26, and preventing coolant from freely entering and escaping the cooling gallery 44. The other cover plates disclosed herein are also assembled with the annular cavity 42 to enclose the cooling gallery 44. At the same time, one or more inlets (illustrated in FIG. 5) and/or outlets (illustrated in FIG. 7) may be provided in the cover plate 56 and other cover plates disclosed herein to allow fluid or other coolants to be circulated throughout the cooling gallery 44 to/from the engine (not shown) in a controlled manner, thereby reducing and/or stabilizing operating temperatures associated with the piston assembly 20 and components thereof. As such, the ring belt 34, combustion bowl 36 and cover plate 56 may delimit a cooling gallery 44 with a fixed volume V1. The cover plate 56 can have many profiles or shapes (illustrated in FIGS. 3, 9, and 10) and include one or more inlets (illustrated in FIG. 5) and/or outlets (illustrated in FIG. 7) as described below.

As illustrated in FIGS. 2*a* and 2*b*, the cover plate 56 may be positioned in the existing cooling gallery 44 and circumferentially extend at least partially along the annular cavity 42. The cover plate 56 may axially protrude beyond the first and second ends 52, 54 into the cooling gallery 44, altering the fixed volume V1 without adding or removing additional material from the underside of the piston crown 26. Accordingly, the cover plate 56 may operate to displace the fluid, e.g., oil or other coolant, flowing in the cooling gallery 44. The cover plate 56 operates to allow a larger cross sectional area of the cooling gallery 44. The cover plate 56 may also operate to allow a variable cross sectional area of the cooling gallery 44. As such the unique shape and placement of the cover plate 56 in the annular cavity 42 can optimize the oil cooling gallery heat exchange efficiency of the cooling gallery 44. The unique shape of the cover plate 56 increases the piston life and better controls the piston temperature by optimizing the cooling gallery 44.

The cover plate 56 extends outwardly from the cooling gallery 44 thereby establishing an increased volume V2 defined in the cooling gallery 44 as illustrated in FIG. 2*a*. Illustrated in FIG. 2*a* is one of a plurality of troughs 104 that extends exteriorly to the annular cavity 42 thereby increasing the fixed volume V1 of the cooling gallery 44 to a maximum volume V2 in the cooling gallery 44. The trough 104 of the cover plate 56 that extends exteriorly to the annular cavity 42 thereby increases the cross-sectional area of the cooling gallery 44 to the largest extent compared to other regions or areas of the cover plate 56. Although the trough 104 is illustrated, other forms or cross-sectional shapes of the cover plate 56 can be assembled with the annular cavity 42 to thereby increase the cross-sectional area of the cooling gallery 44. For example, the cross-sectional shape of the cover plate 56 can be rounded, concave, rectangular, triangular, or some other cross-sectional shape wherein that corresponding portion of the cover plate 56 extends outwardly from the annular cavity 42 to increase the cross-sectional area of the cooling gallery 44.

Illustrated in FIG. 2*b* is one of a plurality of crests 102 of the cover plate 56 that increases the cross-sectional area of the cooling gallery 44 but to a lesser extent than the trough 104 that is illustrated in FIG. 2*a*. thereby establishing a reduced volume V3 defined in the cooling gallery 44. The crest 102 of the cover plate 56 that extends closer to the annular cavity 42 than the trough 104 does. Although the crest 102 is illustrated, other forms or cross-sectional shapes of the cover plate 56 can be assembled with the annular cavity 42 to thereby increase the cross-sectional area of the cooling gallery 44 but to a lesser amount than the trough 104. For example, the cross-sectional shape of the cover plate 56 can be rounded, convex, rectangular, triangular, or some other cross-sectional shape wherein that corresponding portion of the cover plate 56 extends inwardly towards the annular cavity 42. The combination and/or alternating pattern of the troughs 104 and crests 102 creates a variable profile or volume of the cooling gallery 44.

In one form, the crest 102 of the cover plate 56 reduces the fixed volume V1 of the cooling gallery 44 to reduced volume V3, and the cover plate 56 may enhance the cooling efficiency of the cooling gallery 44 by increasing the fill ratio of coolant. For instance, the cover plate 56 may increase the fill ratio of coolant to air in the cooling gallery 44. Moreover, the cover plate 56 may influence the flow rate of coolant within the cooling gallery 44, as a higher ratio of coolant to air is contained in a cooling gallery 44 with reduced volume V3. That is, the same amount of fluid may be introduced into the cooling gallery 44 having a reduced volume V3, which may result in a faster fluid flow rate. As such, the cover plate 56 may increase the flow rate of coolant circulating throughout the cooling gallery 24.

Illustrated in FIG. 3 is one embodiment of the cover plate 56 having a variable circumferential profile 100 that in turn creates a variable volume profile for the cooling gallery 44 when the cover plate 56 is assembled with the first and second ends 52, 54 of the outer and inner walls 46, 48. The circumferential profile 100 of the cover plate 56 has a width 106 and a circumferential length that spans annularly around the cover plate 56. The width 106 can be constant or vary along the length of the circumferential profile 100.

The circumferential profile 100 includes a plurality of crests 102 separated by a plurality of troughs 104 that span along the circumferential length of the cover plate 56. The plurality of crests 102 corresponds to the high or maximum points or regions in the circumferential profile 100 of the cover plate 56. Each of the plurality of crests 102 can be the same height or each of the crests 102 can be a different height relative to each other. When the cover plate 56 is assembled with the first and second ends 52, 54 of the outer and inner walls 46, 48, the volume profile for the cooling gallery 44 decreases in the regions of the plurality of crests 102 as compared to the volume profile in the regions of the plurality of troughs 104. The plurality of troughs 104 corresponds to low or minimum points or regions in the circumferential profile 100 of the cover plate 56. Each of the plurality of troughs 104 can be the same height or a different height relative to each other. When the cover plate 56 is assembled with the first and second ends 52, 54 of the outer and inner walls 46, 48, the volume profile for the cooling gallery 44 increases in the regions of the plurality of troughs 104 as compared to the regions of the plurality of crests 102.

Illustrated in FIG. 3, the plurality of crests 102 includes four crests however in other embodiments the plurality of crests 102 can include more or less of the crests. Illustrated in FIG. 3, the plurality of troughs 104 includes four troughs however in other embodiments the plurality of troughs 104 can include more or less of the troughs.

Figure 4:
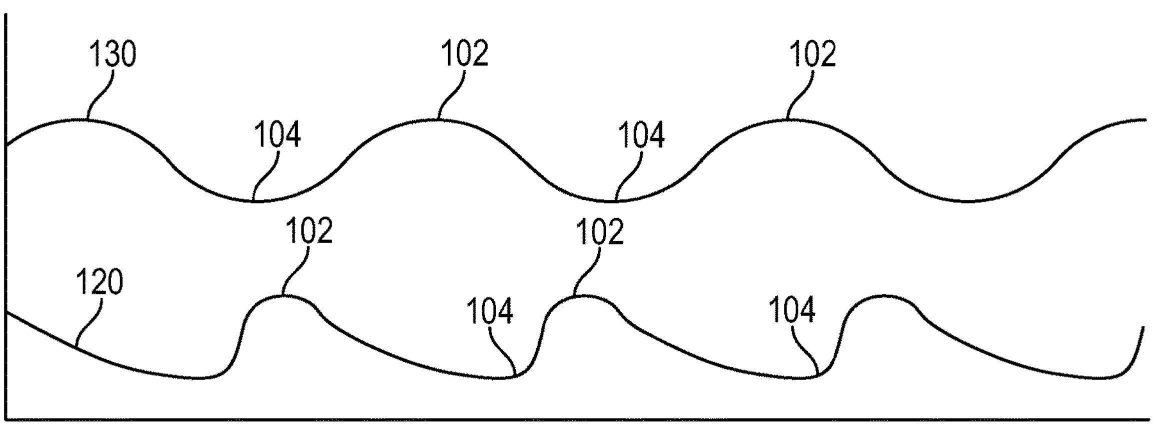
FIG. 4 is exemplary embodiments of variable circumferential profiles of the cover plate illustrated in FIGS. 1 and 2.

Illustrated in FIG. 4, is a variable circumferential profile 120 that is similar to the variable circumferential profile 100 however the variable circumferential profile 120 is a saw-tooth waved profile that includes the plurality of crests 102 separated by the plurality of troughs 104. Illustrated in FIG. 4, is a variable circumferential profile 130 that is a waved profile and similar to the variable circumferential profile 100 that includes the plurality of crests 102 separated by the plurality of troughs 104. FIGS. 3 and 4 illustrate embodiments of a waved profile for the circumferential profile 100 of the cover plate 56 however other embodiments of the waved profile for the circumferential profile 100 are within the scope of this disclosure and may include more or less of or different shapes of the pluralities of crests and troughs.

Figure 5:
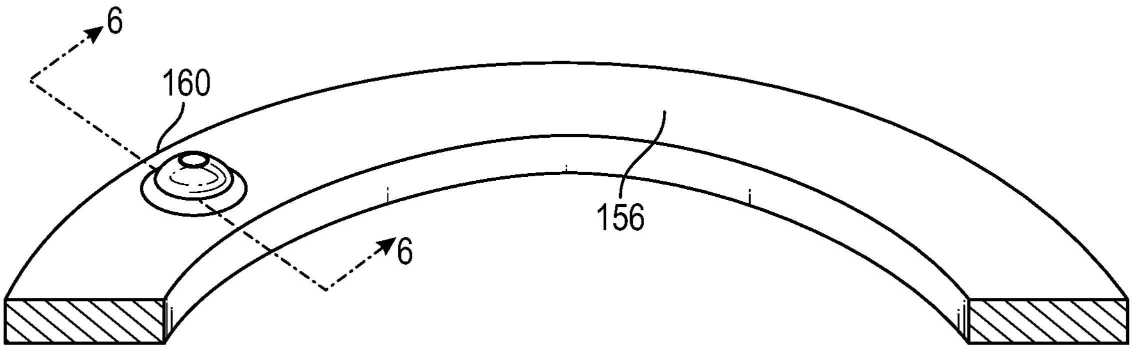
FIG. 5 is a cross-sectional perspective view of an exemplary cover plate of the present disclosure.
Figure 6:
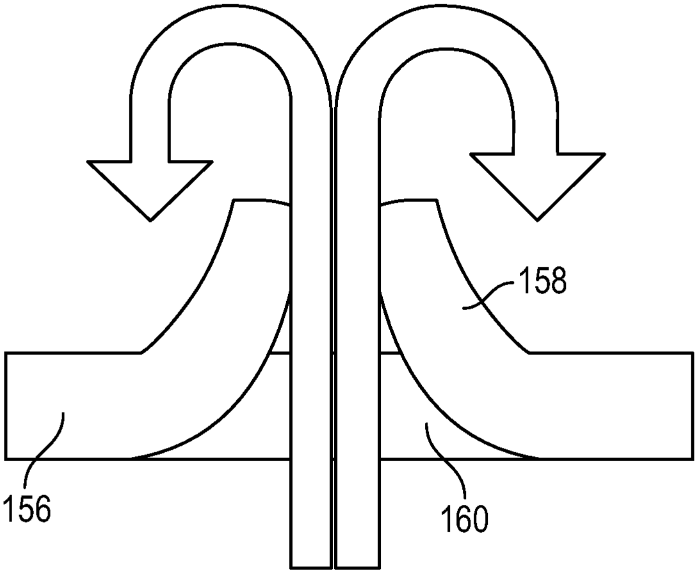
FIG. 6 is a cross-sectional view of the cover plate illustrated in FIG. 5.

Illustrated in FIGS. 5 and 6 is another embodiment of a cover plate 156. The cover plate 156 includes a gallery inlet or aperture 160 that allows an inflow of oil or other fluid coolant into the cooling gallery 44. In other embodiments, additional gallery inlets or apertures 160 can be in the cover plate 156 or any of the other cover plates disclosed in the present disclosure to allow coolant to be sprayed into the cooling gallery 44 via a pump and spray nozzle such as a piston cooling nozzle (not shown).

The cover plate 156 includes an annular wall 158 that surrounds the gallery inlet or aperture 160. The annular wall 158 has a height that extends towards the annular cavity 42 and forms a diameter of the gallery inlet or aperture 160 for receiving fluid sprayed from a piston cooling nozzle (not shown), e.g., engine oil. The diameter of the gallery inlet or aperture 160 can vary as desired to receive coolant from the piston cooling nozzle.

Figure 7:
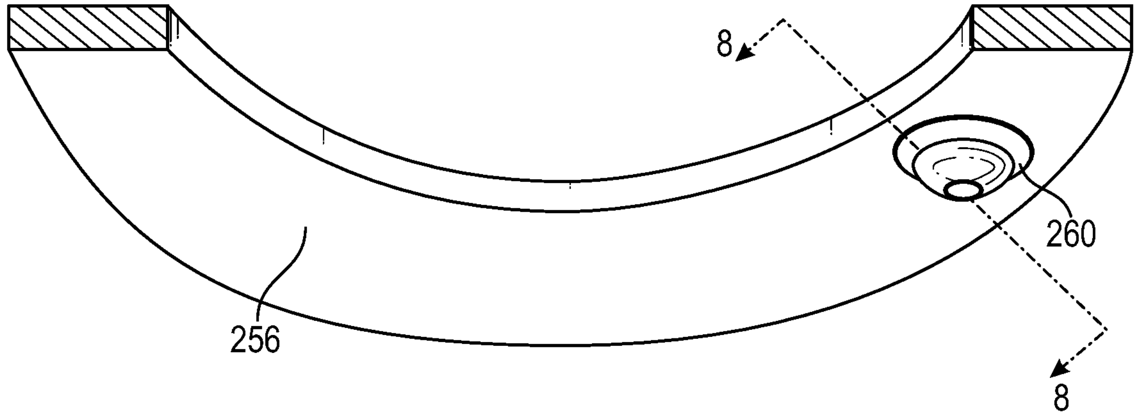
FIG. 7 is a cross-sectional perspective view of an exemplary cover plate of the present disclosure.
Figure 8:
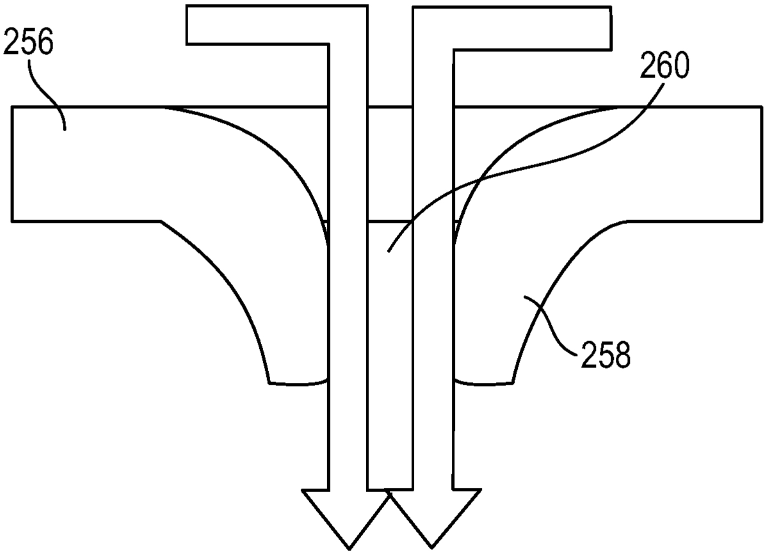
FIG. 8 is a cross-sectional view of the cover plate illustrated in FIG. 7.

Illustrated in FIGS. 7 and 8 is another embodiment of a cover plate 256. The cover plate 256 includes a gallery outlet or aperture 260 that allows an outflow of oil or other fluid coolant out of the cooling gallery 44. In other embodiments, additional gallery outlets or apertures 260 can be in the cover plate 256 or any of the other cover plates disclosed in the present disclosure to allow coolant or oil to drain from the cooling gallery 44.

The cover plate 256 includes an annular wall 258 that surrounds the gallery inlet or aperture 160. The annular wall 158 has a height that extends away from the annular cavity 42 and forms a diameter of the gallery inlet or aperture 260 for allowing fluid or oil to drain from the cooling gallery 44. The diameter of the gallery inlet or aperture 260 can vary as desired to enable coolant or oil to drain.

Figure 9:
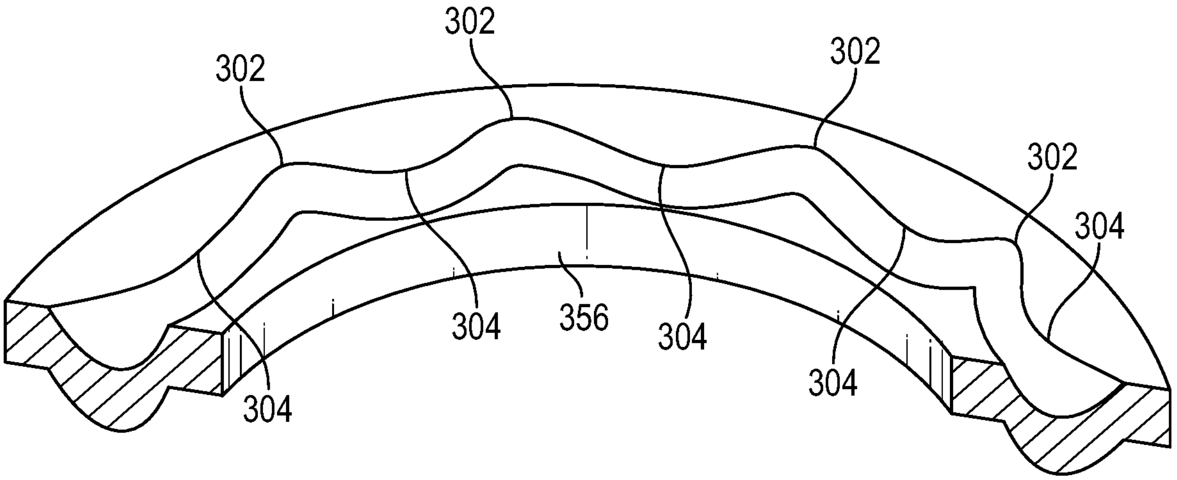
FIG. 9 is a cross-sectional perspective view of an exemplary cover plate of the present disclosure.

Illustrated in FIG. 9 is another embodiment of a cover plate 356 that is similar the cover plate 56. The cover plate 356 also includes a plurality of troughs 304 separated by a plurality of crests 302 wherein this particular embodiment illustrates three troughs 304 and three crests 302. The cover plate 356 can include one or more of the gallery inlet or aperture 160 and/or the gallery outlet or aperture 260.

Figure 10:
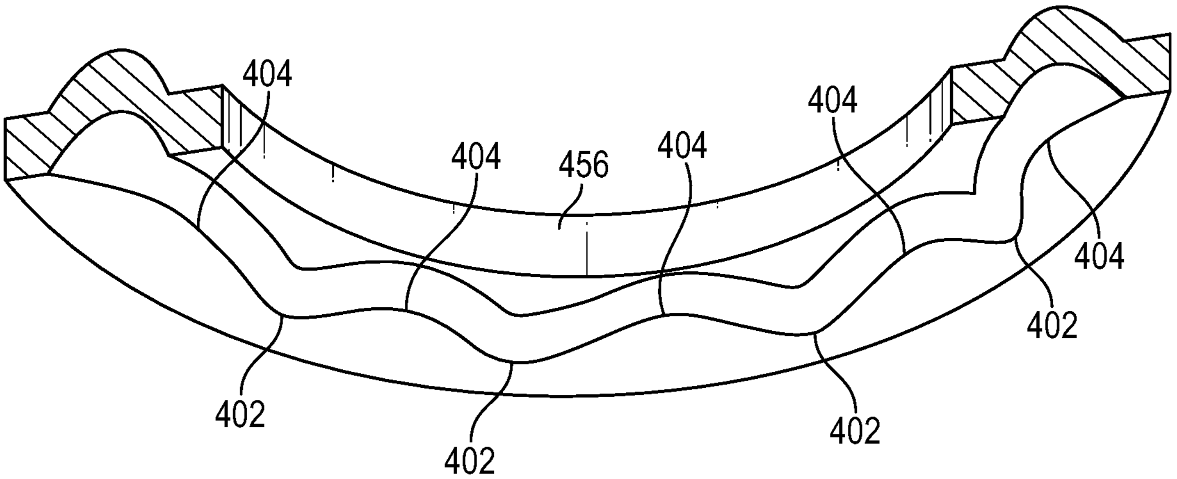
FIG. 10 is a cross-sectional perspective view of an exemplary cover plate of the present disclosure.
Figure 11:
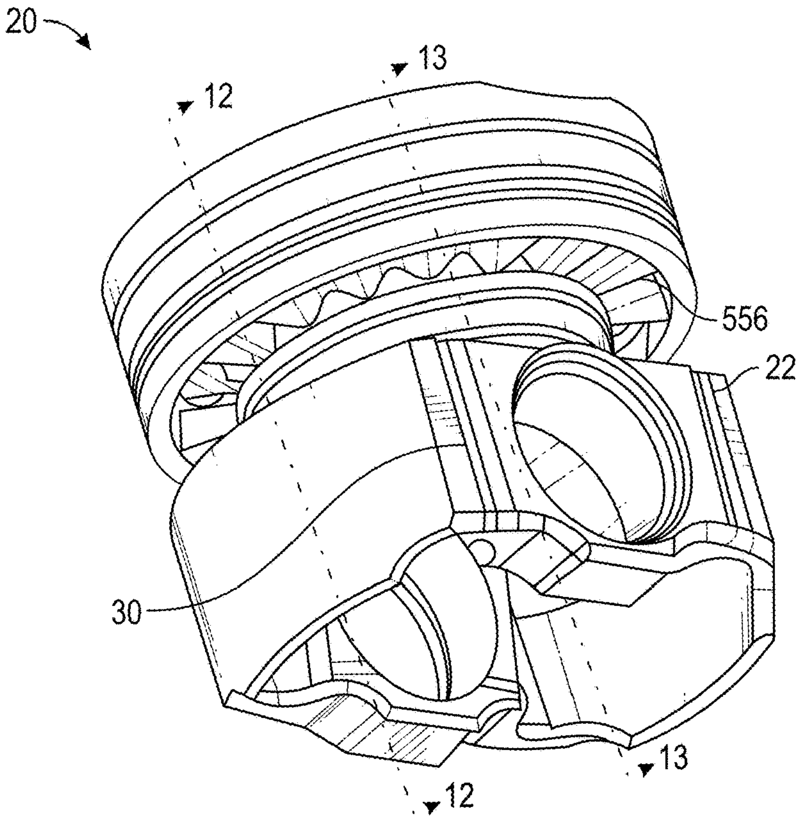
FIG. 11 is bottom perspective view of a piston having a cover plate positioned in a cooling gallery of a piston crown according to one implementation of the present disclosure.

Illustrated in FIG. 10 is another embodiment of a cover plate 456 that is similar the cover plate 356 however cover plate 456 is inverted as compared to cover plate 356 in FIG. 9. The cover plate 456 also includes a plurality of troughs 404 separated by a plurality of crests 402 wherein this particular embodiment illustrates three troughs 404 and three crests 402. When the cover plate 456 is assembled with the annular cavity 42, the plurality of crests 402 and the plurality of troughs 404 occupy at least part of cooling gallery 44 thereby establishing a reduced volume V3 defined in the cooling gallery 44. The crests 402 of the cover plate 456 that extend interiorly to the annular cavity 42 thereby decrease the cross-sectional area of the cooling gallery 44 a greater amount than the troughs 404 that extend interiorly. Other forms or cross-sectional shapes of the cover plate 456 can be assembled with the annular cavity 42 to thereby decrease the cross-sectional area of the cooling gallery 44.

The cover plate 456 operates to allow a smaller cross sectional area of the cooling gallery 44. The cover plate 456 may also operate to allow a variable cross sectional area of the cooling gallery 44. As such the unique shape and placement of the cover plate 456 in the annular cavity 42 can optimize the oil cooling gallery heat exchange efficiency of the cooling gallery 44. The unique shape of the cover plate 456 increases the piston life and better controls the piston temperature by optimizing the cooling gallery 44.

Turning now to FIGS. 11-18 is an embodiment of a bottom cover plate 556 assembled with the piston 22 of the piston assembly 20. The piston 22 is similar to the FIG. 1 embodiment, unless described otherwise below.

Figure 12:
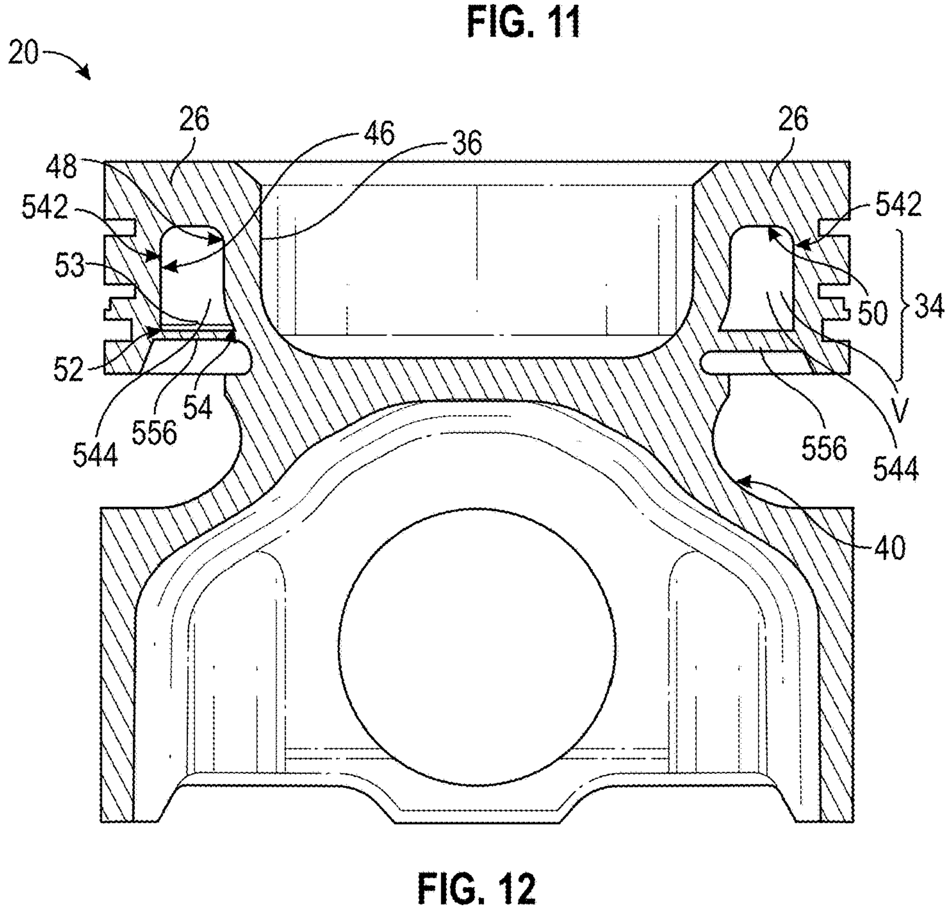
FIG. 12 is a first cross-sectional view of the piston and the cover plate illustrated in FIG. 11.
Figure 13:
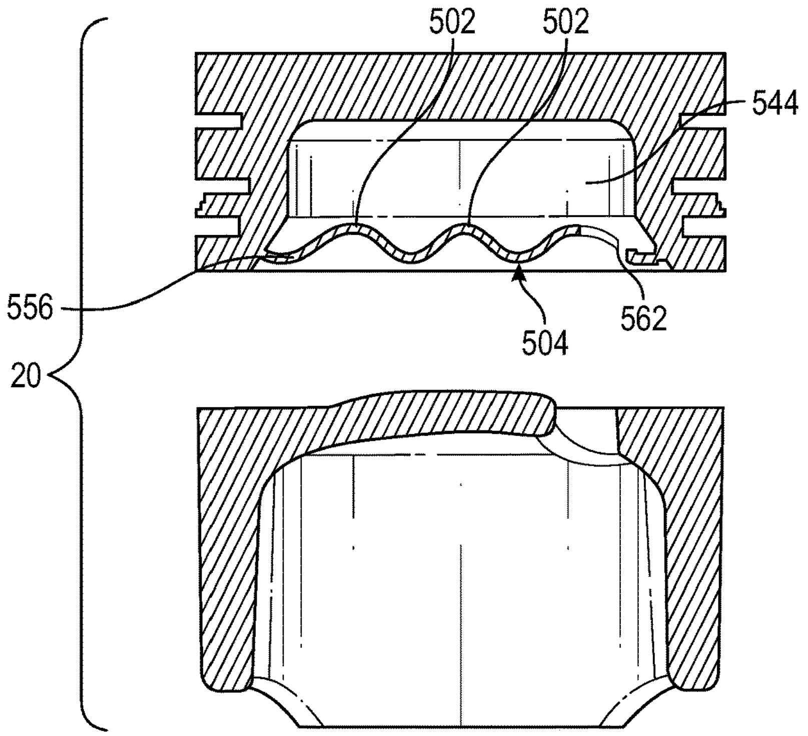
FIG. 13 is a second cross-sectional view of the piston and the cover plate illustrated in FIG. 11.
Figure 14:
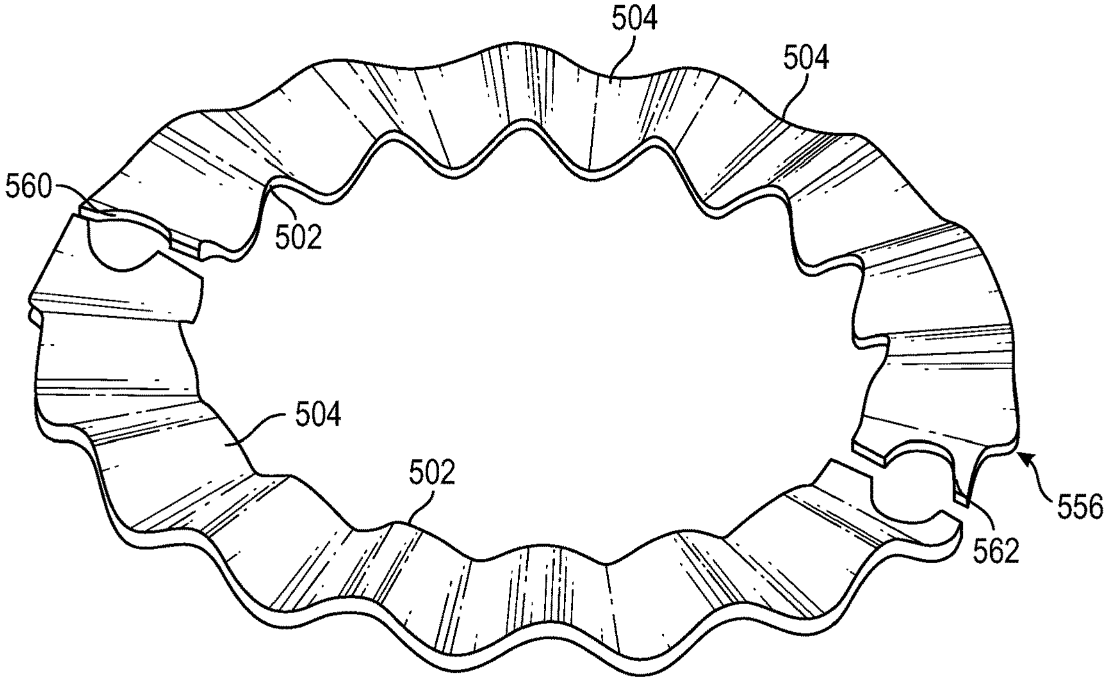
FIG. 14 is a top perspective view of the cover plate illustrated in FIG. 11.
Figure 15:
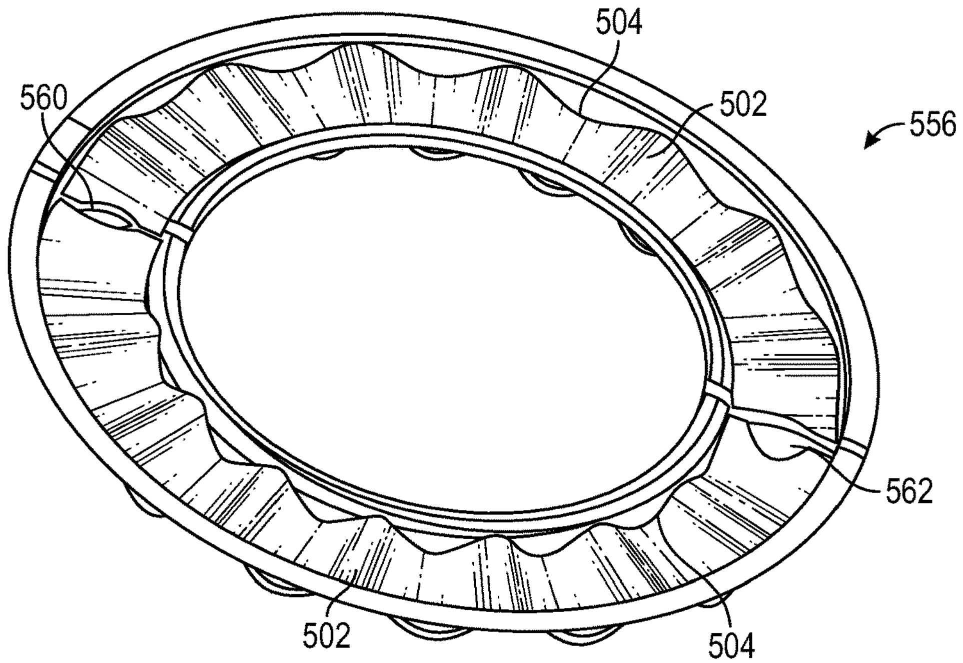
FIG. 15 is a top perspective view of the cover plate illustrated in FIG. 11 with a sealing edge.
Figure 16:
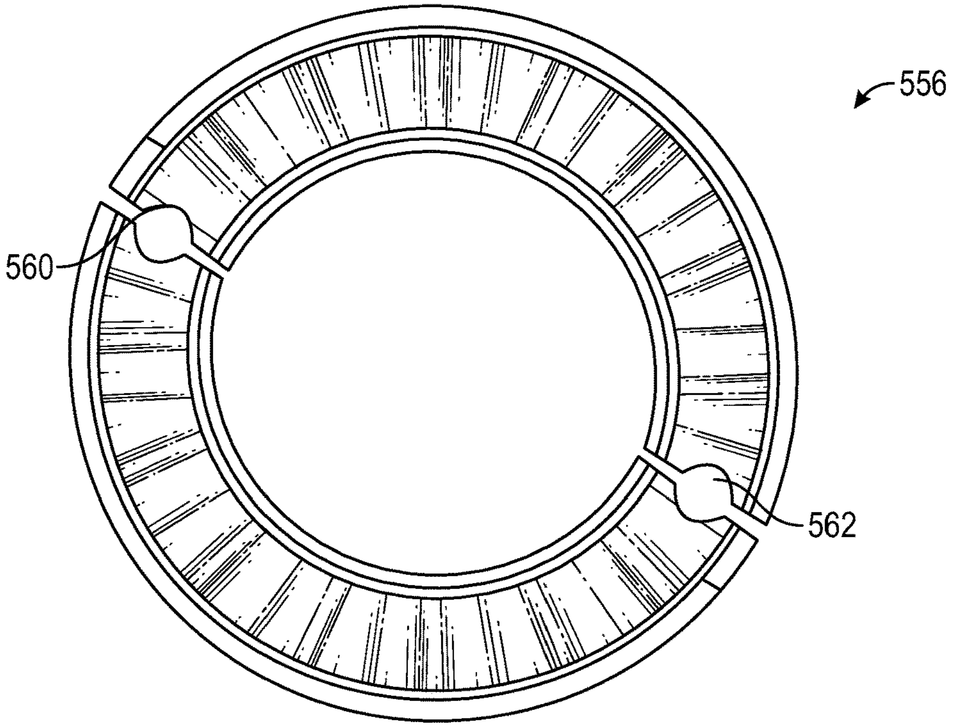
FIG. 16 is a bottom view of the cover plate illustrated in FIG. 11 with a sealing edge.
Figure 17:
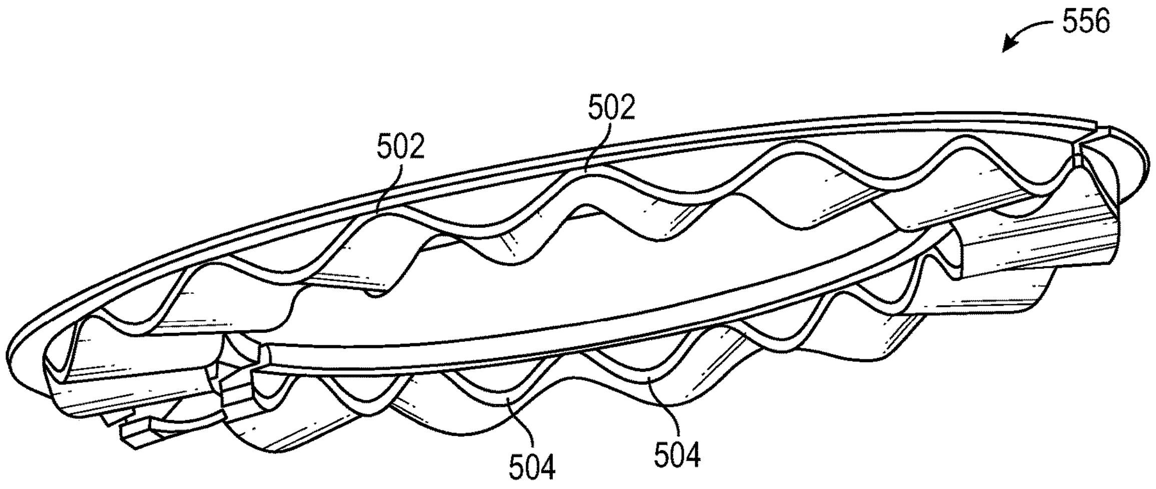
FIG. 17 is a side perspective view of the cover plate illustrated in FIG. 11 with a sealing edge.

The piston crown 26, may generally form a circumferentially extending annular cavity 542 defining at least part of a cooling gallery 544. The annular cavity 542 may be formed into the underside of the piston crown 26 adjacent to the ring belt portion 34. The annular cavity 542 together with a bottom portion may define the cooling gallery 544 which may generally facilitate cooling of the piston 22. The cooling gallery 544 may generally extend about a perimeter of the piston crown. As illustrated in FIG. 12, the cooling gallery 544 may be defined in part by the ring belt portion 34 and the combustion bowl 36. For example, the ring belt portion 34 may define an annular outer wall 46, the combustion bowl 36 may define a radially inner wall 48, and a top wall 50 may extend between the outer and inner wall 46, 48.

The outer wall 46 may terminate at a first end 52, and the inner wall 48 may terminate at a second end 54. The first and second ends 52, 54 of the outer and inner walls 46, 48 are configured to secure a cover plate 556 to the piston crown 26, as will be described in more detail below. For instance, the first and/or second end 52, 54 may include a radial step or shelf for supporting a complementary or sealing edge of the cover plate 556. Additionally or alternatively, the ends 52, 54 may include a notch or collar for insertably receiving an edge of the cover plate 556. As a further example, the ends 52, 54 may include bores aligning with corresponding bores on the cover plate 556 for receiving fasteners. Moreover, the first and second ends 52, 54 may prevent circumferential rotation of the cover plate 556 during reciprocating motion of the piston 22. The first and second ends 52, 54 define an opening 53 that spans between the first and second ends 52, 54. The opening 53 is positioned opposite the top wall 50.

The cooling gallery 544 includes an interior volume V located within the piston crown 26. The cooling gallery 544 is in fluid communication with one or more nozzles (not shown) for directing fluid, e.g., engine oil, into the cooling gallery 544. This fluid will cool the inside walls 46, 48, 50 of the cooling gallery 544 as a result of the rapid reciprocating motion typical of pistons for internal combustion engines during operation. The fluid that is introduced into the cooling gallery 544 may be permitted to escape through the aperture 32 for drainage backing into the crank case of the engine (not shown). The fluid may also be able to drain towards the piston skirt 28 around the outer surfaces or perimeter of the piston 22, at least to the extent allowed by the cover plate 556.

The annular recess 40 may be formed by the panel area 38 and may generally be located between the ring belt 34 and the piston skirt 28. The cooling gallery 544 may be in fluid communication with the annular recess 40 via one or more cover plate apertures 560, 562. As such, the annular recess 40 and cooling gallery 544 may both accumulate fluid during operation of the piston 22 within the internal combustion engine. Therefore, both the cooling gallery 544 and annular recess 40 may include fluid that cools the piston.

The piston 22 includes a bottom cover plate 556 substantially enclosing the annular cavity 42 within the piston crown 26 thereby defining the cooling gallery 544. The cover plate 556 may be secured to the first and second ends 52, 54 of the outer and inner wall 46, 48, respectively. The cover plate 556 may be generally be accessible after assembly of the piston crown 26 and skirt 28 to allow insertion, assembly and/or removal of the cover plate 556 from the piston 22.

The cover plate 556 forms a lower boundary of the cooling gallery 544, thereby enclosing the cooling gallery 544 within the piston crown 26, and preventing coolant from freely entering and escaping the cooling gallery 544 except through the one or more cover plate apertures 560, 562. In some embodiments, one or more inlets and/or outlets, previously described, may be provided in the cover plate 556 to allow fluid or other coolants to be circulated throughout the coolant gallery 544 to/from the engine (not shown) in a controlled manner, thereby reducing and/or stabilizing operating temperatures associated with the piston assembly 20 and components thereof.

The cover plate 556 is positioned in the existing cooling gallery 544 and circumferentially extends at least partially along the annular cavity 542. The cover plate 556 axially protrude beyond the first and second ends 52, 54 into the cooling gallery 544, altering the fixed volume V without adding or removing additional material from the underside of the piston crown 26. Accordingly, the cover plate 556 may operate to displace the fluid, e.g., oil or other coolant, flowing in the cooling gallery 544. The cover plate 556 operates to allow a variable cross sectional area of the cooling gallery 544. As such the unique shape and placement of the cover plate 556 in the annular cavity 542 can optimize the oil cooling gallery heat exchange efficiency of the cooling gallery 544. The unique shape of the cover plate 556 increases the piston life and better controls the piston temperature by optimizing the cooling gallery 544.

Figure 18:
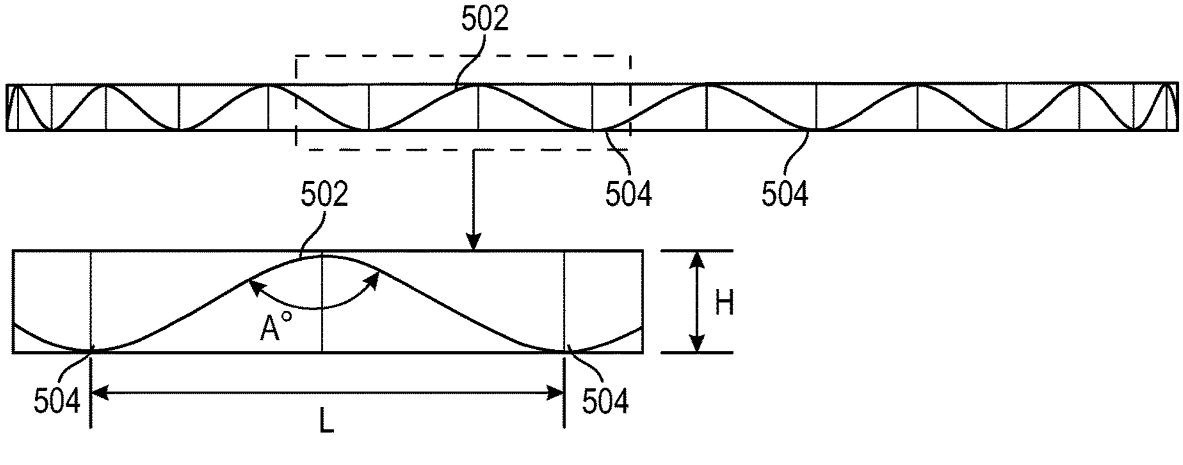
FIG. 18 is a graphic representation of the cover plate illustrated in FIG. 11.
Figure 19:
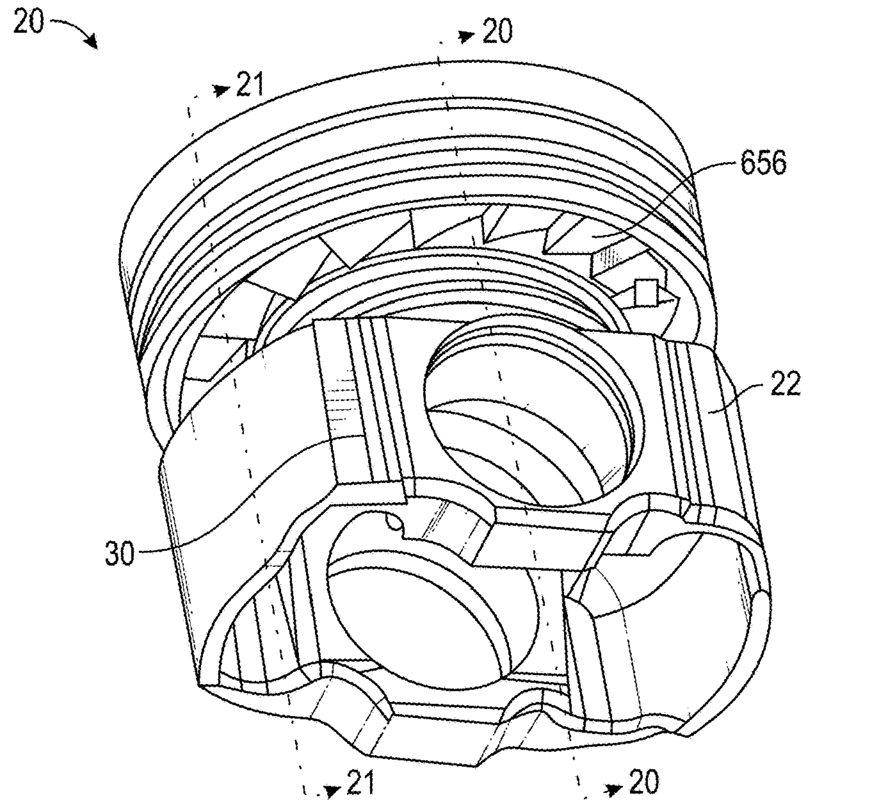
FIG. 19 is bottom perspective view of a piston having a cover plate positioned in a cooling gallery of a piston crown according to one implementation of the present disclosure.

The cover plate 556 includes a plurality of troughs 504 separated by a plurality of crests 502. The distance between two of the troughs 504 is a length L is illustrated in FIG. 18. A height H between the trough 504 and the crest 502 is illustrated in FIG. 18. An angle A° that spans between the crest 502 and the trough 504 is illustrated in FIG. 18. The troughs 504 of the cover plate 556 extends or increases a volume of the annular cavity 542 and thereby increases the cross-sectional area of the cooling gallery 544 to the largest extent. Although the trough 504 has a concave shape, other forms or cross-sectional shapes of the trough 504 can be assembled with the annular cavity 542. For example, the cross-sectional shapes of the troughs 504 can be rounded, rectangular, triangular, or some other cross-sectional shape wherein that corresponding portion of the cover plate 556 extends outwardly from the annular cavity 542.

The crests 502 of the cover plate 556 decreases the cross-sectional area of the cooling gallery 544 as compared to the trough 504 thereby establishing a reduced volume defined in the cooling gallery 544. The crest 502 extends further into the annular cavity 542 than the trough 504 does. Although the crest 502 has a convex shape, other forms or cross-sectional shapes of the cover plate 556 can be assembled with the annular cavity 542 to thereby decrease the cross-sectional area of the cooling gallery 544 and vary the cross-sectional area of the cooling gallery 544. For example, the cross-sectional shapes of the crests 502 can be rounded, rectangular, triangular, or some other cross-sectional shape wherein that corresponding portion of the cover plate 556 extends inwardly towards the annular cavity 542. The combination and/or alternating pattern of the troughs 504 and crests 502 creates a variable profile or volume of the cooling gallery 544.

The crests 502 and troughs 504 of the cover plate 556 varies the volume of the cooling gallery 544, which shows a benefit of a reduction in temperature for the cooling gallery 544 and under the piston crown 26 as compared to a flat cover plate design. Another benefit of the crests 502 and troughs 504 of the cover plate 556 is a lower maximum temperature change of the piston crown rim as compared to temperature of the cooling gallery 544. This is a benefit in a reduction or drop of piston solid maximum temperature as compared to a flat cover plate design. Another benefit of the crests and troughs 504 of the cover plate 556 is a drop in temperature of portions of the piston crown 26. Another benefit of the crests 502 and troughs 504 of the cover plate 556 is heat flux values are higher as compared to a flat cover plate design which is rejecting more heat from solid to oil side of the piston 22. Another benefit of the crests 502 and troughs 504 of the cover plate 556 is guiding oil to move in an upward direction in the cooling gallery 544, therefore oil is sloshing or moving against the cover plate 556 thus better heat transfer as compared to a flat cover plate design. The oil sloshing benefits in reducing higher temperature on the piston crown 26. Another benefit of the crests 502 and troughs 504 of the cover plate 556 is an oil volume fraction is well distributed in cover plate 556 as compared to a flat cover plate design due to improved oil sloshing in the cooling gallery 544. The volume fraction of oil or gallery filling ratio is higher in cover plate 556 than a flat cover plate.

Turning now to FIGS. 19-26 is an embodiment of a bottom cover plate 656 assembled with the piston 22 of the piston assembly 20. The piston 22 is similar to the FIG. 1 embodiment, unless described otherwise below.

Figure 20:
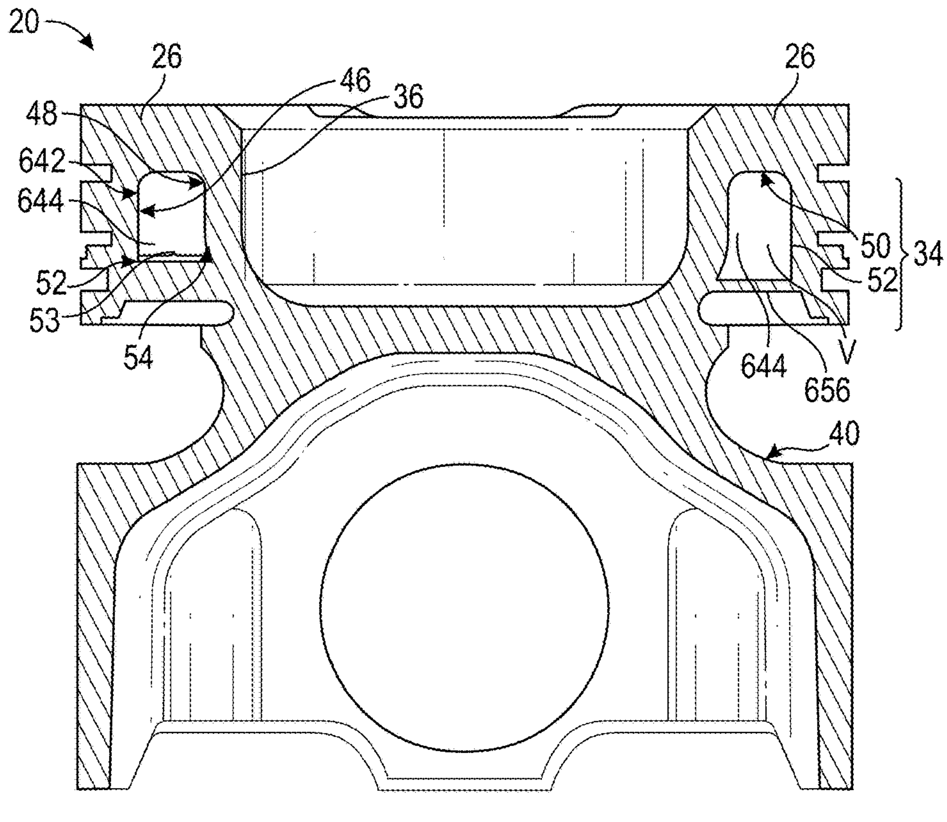
FIG. 20 is a first cross-sectional view of the piston and the cover plate illustrated in FIG. 19.
Figure 21:
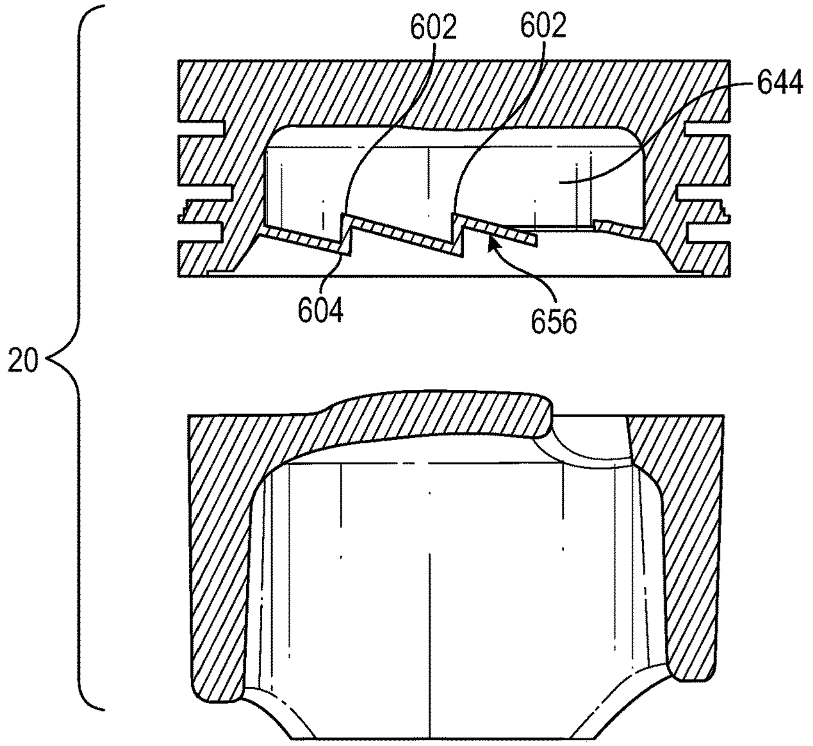
FIG. 21 is a second cross-sectional view of the piston and the cover plate illustrated in FIG. 19.
Figure 22:
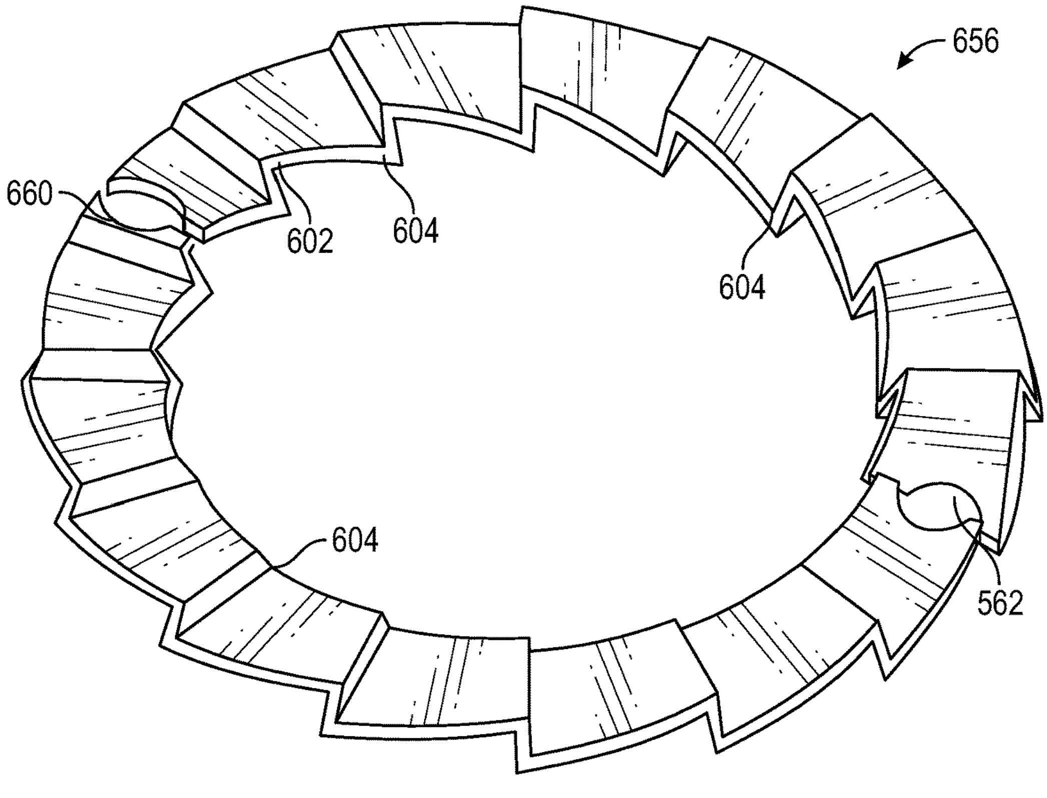
FIG. 22 is a top perspective view of the cover plate illustrated in FIG. 19.
Figure 23:
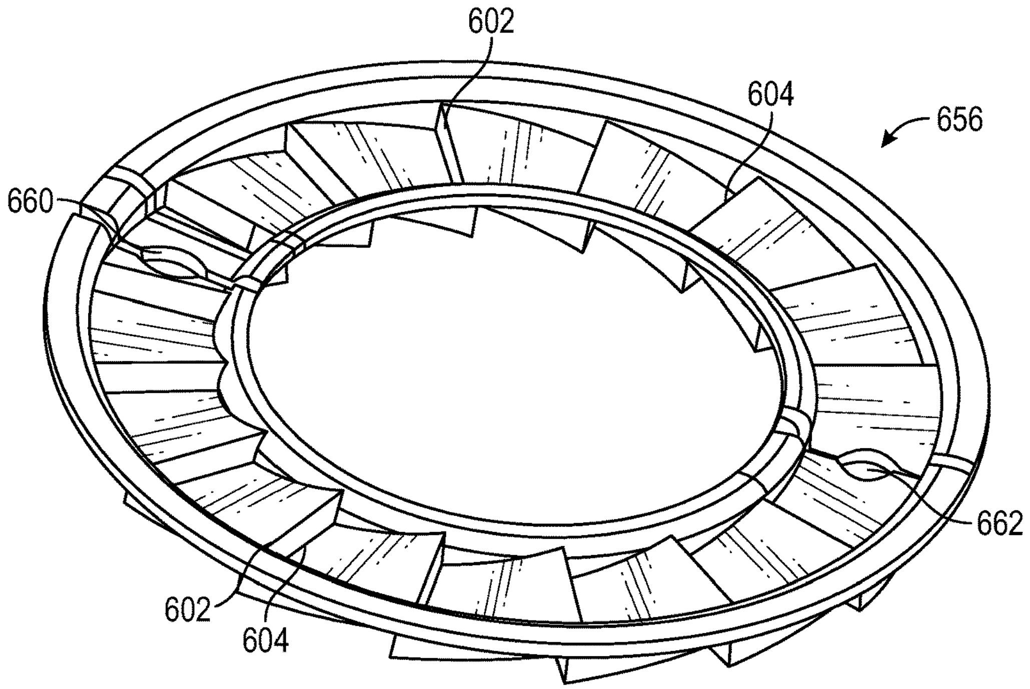
FIG. 23 is a top perspective view of the cover plate illustrated in FIG. 19 with a sealing edge.
Figure 24:
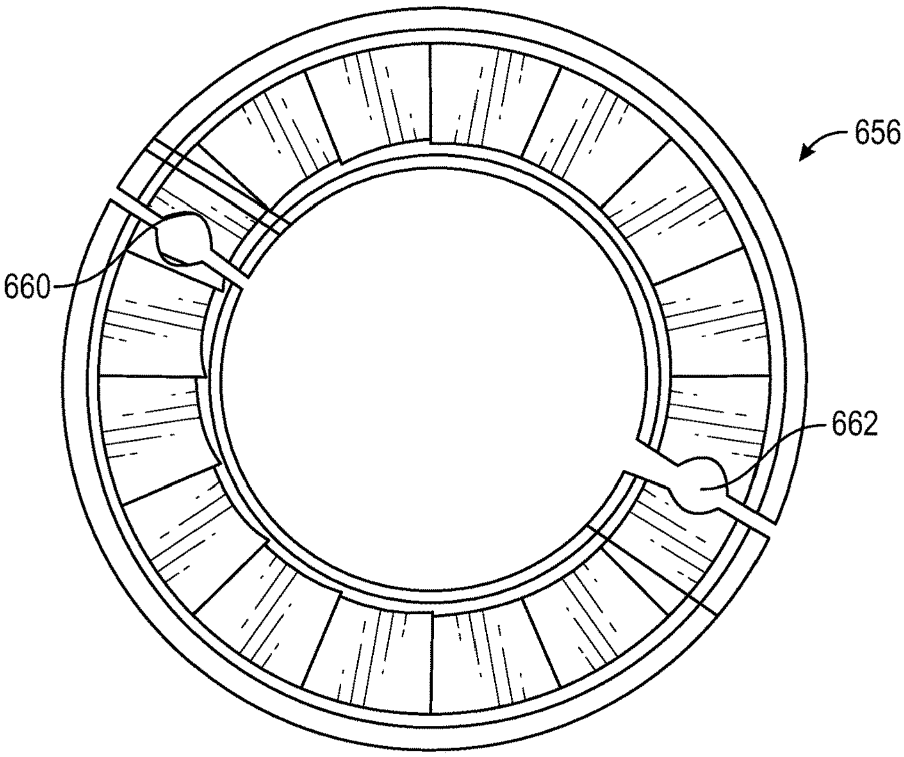
FIG. 24 is a bottom view of the cover plate illustrated in FIG. 19 with a sealing edge.
Figure 25:
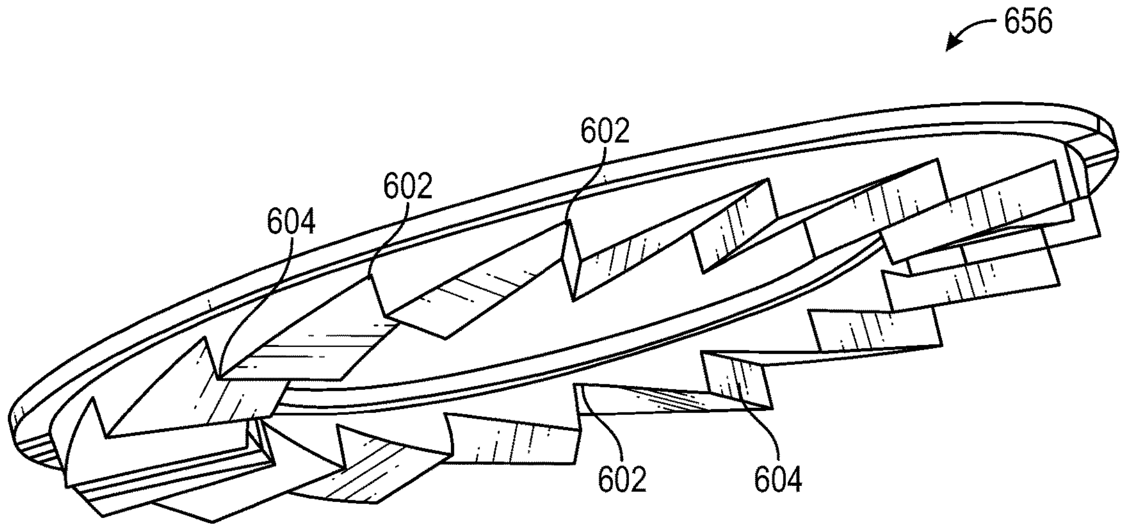
FIG. 25 is a side perspective view of the cover plate illustrated in FIG. 19 with a sealing edge.

The piston crown 26, may generally form a circumferentially extending annular cavity 642 defining at least part of a cooling gallery 644. The annular cavity 642 may be formed into the underside of the piston crown 26 adjacent to the ring belt portion 34. The annular cavity 642 together with a bottom portion may define the cooling gallery 644 which may generally facilitate cooling of the piston 22. The cooling gallery 644 may generally extend about a perimeter of the piston crown. As illustrated in FIG. 20, the cooling gallery 644 may be defined in part by the ring belt portion 34 and the combustion bowl 36. For example, the ring belt portion 34 may define an annular outer wall 46, the combustion bowl 36 may define a radially inner wall 48, and a top wall 50 may extend between the outer and inner wall 46, 48.

The outer wall 46 may terminate at a first end 52, and the inner wall 48 may terminate at a second end 54. The first and second ends 52, 54 of the outer and inner walls 46, 48 are configured to secure a cover plate 656 to the piston crown 26. For instance, the first and/or second end 52, 54 may include a radial step or shelf for supporting a complementary or sealing edge of the cover plate 656. Additionally or alternatively, the ends 52, 54 may include a notch or collar for insertably receiving an edge of the cover plate 656. As a further example, the ends 52, 54 may include bores aligning with corresponding bores on the cover plate 656 for receiving fasteners. Moreover, the first and second ends 52, 54 may prevent circumferential rotation of the cover plate 656 during reciprocating motion of the piston 22. The first and second ends 52, 54 define an opening 53 that spans between the first and second ends 52, 54. The opening 53 is positioned opposite the top wall 50.

The cooling gallery 644 includes an interior volume V located within the piston crown 26. The cooling gallery 644 is in fluid communication with one or more nozzles (not shown) for directing fluid, e.g., engine oil, into the cooling gallery 644. This fluid will cool the inside walls 46, 48, 50 of the cooling gallery 644 as a result of the rapid reciprocating motion typical of pistons for internal combustion engines during operation. The fluid that is introduced into the cooling gallery 644 may be permitted to escape through the aperture 32 for drainage backing into the crank case of the engine (not shown). The fluid may also be able to drain towards the piston skirt 28 around the outer surfaces or perimeter of the piston 22, at least to the extent allowed by the cover plate 656.

The annular recess 40 may be formed by the panel area 38 and may generally be located between the ring belt 34 and the piston skirt 28. The cooling gallery 644 may be in fluid communication with the annular recess 40 via one or more cover plate apertures 660, 662. As such, the annular recess 40 and cooling gallery 644 may both accumulate fluid during operation of the piston 22 within the internal combustion engine. Therefore, both the cooling gallery 644 and annular recess 40 may include fluid that cools the piston.

The piston 22 includes a bottom cover plate 656 substantially enclosing the annular cavity 42 within the piston crown 26 thereby defining the cooling gallery 644. The cover plate 656 may be secured to the first and second ends 52, 54 of the outer and inner wall 46, 48, respectively. The cover plate 656 may be generally be accessible after assembly of the piston crown 26 and skirt 28 to allow insertion, assembly and/or removal of the cover plate 656 from the piston 22.

The cover plate 656 forms a lower boundary of the cooling gallery 644, thereby enclosing the cooling gallery 644 within the piston crown 26, and preventing coolant from freely entering and escaping the cooling gallery 644 except through the one or more cover plate apertures 660, 662. In some embodiments, one or more inlets and/or outlets, previously described, may be provided in the cover plate 656 to allow fluid or other coolants to be circulated throughout the coolant gallery 644 to/from the engine (not shown) in a controlled manner, thereby reducing and/or stabilizing operating temperatures associated with the piston assembly 20 and components thereof.

The cover plate 656 is positioned in the existing cooling gallery 644 and circumferentially extends at least partially along the annular cavity 642. The cover plate 656 axially protrudes beyond the first and second ends 52, 54 into the cooling gallery 644, altering the fixed volume V without adding or removing additional material from the underside of the piston crown 26. Accordingly, the cover plate 656 may operate to displace the fluid, e.g., oil or other coolant, flowing in the cooling gallery 644. The cover plate 656 operates to allow a variable cross sectional area of the cooling gallery 644. As such the unique shape and placement of the cover plate 656 in the annular cavity 642 can optimize the oil cooling gallery heat exchange efficiency of the cooling gallery 644. The unique shape of the cover plate 656 increases the piston life and better controls the piston temperature by optimizing the cooling gallery 644.

Figure 26:
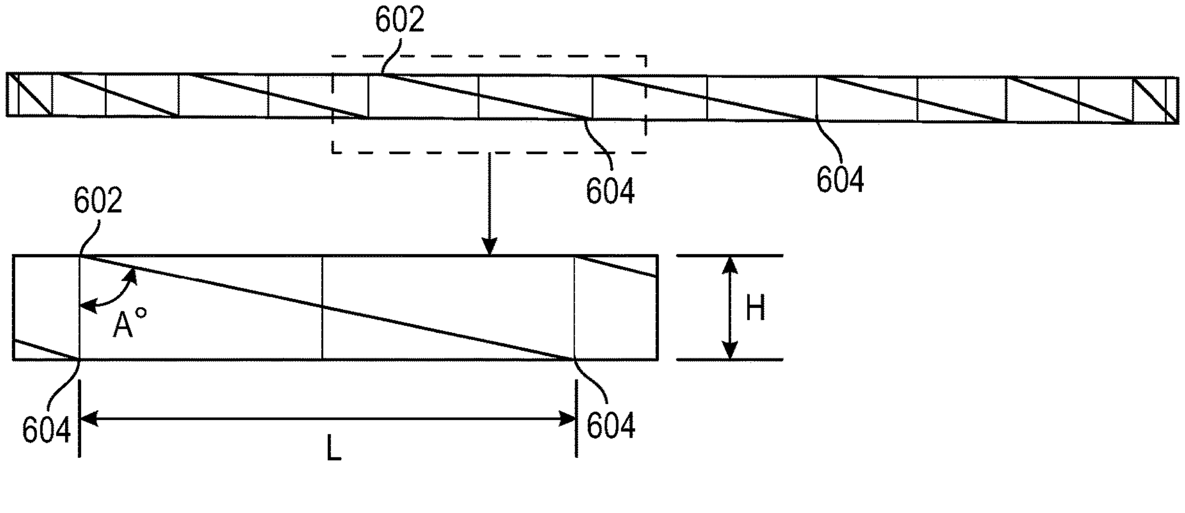
FIG. 26 is a graphic representation of the cover plate illustrated in FIG. 19.

The cover plate 656 includes a plurality of troughs 604 separated by a plurality of crests 602. The distance between two of the troughs 604 is a length L is illustrated in FIG. 26. A height H between the trough 604 and the crest 602 is illustrated in FIG. 26. An angle A° that spans between the crest 602 and the trough 604 is illustrated in FIG. 26. The troughs 604 of the cover plate 656 extends or increases a volume of the annular cavity 642 and thereby increases the cross-sectional area of the cooling gallery 644 to the largest extent. The cross-sectional shapes of the crests 602 and the troughs 604 form a saw-tooth pattern or a series of triangular cross-sectional shapes wherein that corresponding portion of the cover plate 656 extends outwardly from the annular cavity 642.

The crests 602 of the cover plate 656 decreases the cross-sectional area of the cooling gallery 644 as compared to the trough 604 thereby establishing a reduced volume defined in the cooling gallery 644. The crest 602 extends further into the annular cavity 642 than the trough 604 does. The cross-sectional shapes of the crests 602 and troughs 604 are triangular. The combination and/or alternating pattern of the troughs 604 and crests 602 creates a variable profile or volume of the cooling gallery 644.

The crests 602 and troughs 604 of the cover plate 656 varies the volume of the cooling gallery 644, which shows a benefit of a reduction in temperature for the cooling gallery 644 and under the piston crown 26 as compared to a flat cover plate design. Another benefit of the crests 602 and troughs 604 of the cover plate 656 is a lower maximum temperature change of the piston crown rim as compared to temperature of the cooling gallery 644. This is a benefit in a reduction or drop of piston solid maximum temperature as compared to a flat cover plate design. Another benefit of the crests and troughs 604 of the cover plate 656 is a drop in temperature of portions of the piston crown 26. Another benefit of the crests 602 and troughs 604 of the cover plate

656 is heat flux values are higher as compared to a flat cover plate design which is rejecting more heat from solid to oil side of the piston 22. Another benefit of the crests 602 and troughs 604 of the cover plate 656 is guiding oil to move in an upward direction in the cooling gallery 644, therefore oil is sloshing or moving against the cover plate 656 thus better heat transfer as compared to a flat cover plate design. The oil sloshing benefits in reducing higher temperature on the piston crown 26. Another benefit of the crests 602 and troughs 604 of the cover plate 656 is an oil volume fraction is well distributed in cover plate 656 as compared to a flat cover plate design due to improved oil sloshing in the cooling gallery 644. The volume fraction of oil or gallery filling ratio is higher in cover plate 656 than a flat cover plate.

Figure 27:
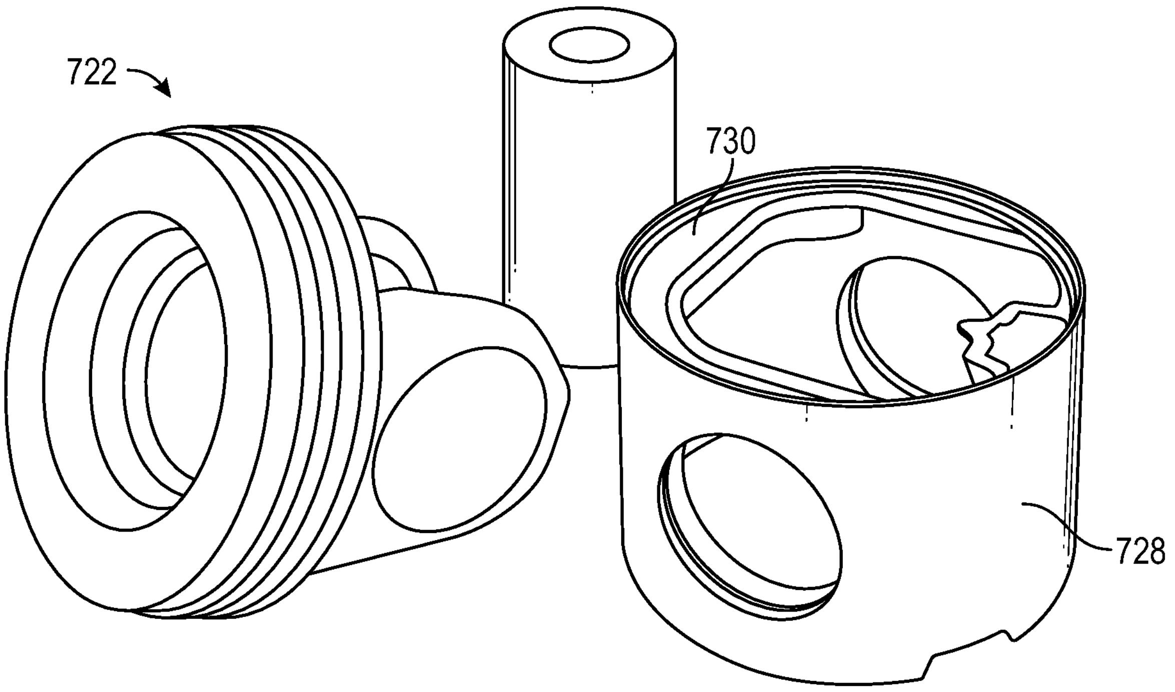
FIG. 27 is a perspective view of an articulated piston without a cover plate wherein a cooling gallery of a piston crown is enclosed by a skirt of the piston according to one implementation of the present disclosure.

Illustrated in FIG. 27 is one embodiment of an articulated piston 722 without a cover plate as previously described. Instead, an oil cooling gallery is enclosed by a skirt 728 wherein a variable cross-sectional profile 730 as described above with respect to the cover plates is formed in the piston skirt 728.

As is evident from the figures and text presented above, a variety of aspects of the present disclosure are contemplated.

Various aspects of the present application are contemplated. According to one aspect, an internal combustion engine piston, comprising a crown defining an annular cavity between an inner wall and an outer wall, the annular cavity including an opening opposite a top wall, and at least partially defining a cooling gallery; and a cover plate is assembled with the inner and outer walls in the opening to form a lower boundary of the cooling gallery thereby enclosing the cooling gallery within the piston crown, the cover plate includes a plurality of crests separated by a plurality of troughs wherein the crests and troughs are arranged to form a variable volume profile of the cooling gallery.

In one embodiment, wherein the cover plate includes at least one aperture.

In one embodiment, wherein the aperture is located on one of the plurality of crests.

In one embodiment, wherein the aperture is located on one of the plurality of troughs.

In one embodiment, wherein the plurality of crests and the plurality of troughs are arranged in a waved profile.

In one embodiment, wherein the variable volume profile of the cooling gallery is further defined by the plurality of crests that decreases the volume profile of the cooling gallery, and the plurality of troughs that increases the volume profile of the cooling gallery.

In one embodiment, wherein each of the plurality of crests extends further into the annular cavity than each of the plurality of troughs.

In one embodiment, wherein each of the plurality of crests has a convex shape and each of the plurality of troughs has a concave shape.

In one embodiment, wherein the cover plate includes a sealing edge configured for engagement with the inner and outer walls of the piston crown.

In one embodiment, wherein the plurality of crests and the plurality of troughs are arranged in a sawtooth profile.

In one embodiment, wherein each of the plurality of crests and each of the plurality of troughs has a cross-sectional shape that is triangular.

In one embodiment, wherein the variable volume profile of the cooling gallery is further defined by the plurality of crests that decreases the volume profile of the cooling gallery, and the plurality of troughs that increases the volume profile of the cooling gallery.

In one embodiment, wherein each of the plurality of crests extends further into the annular cavity than each of the plurality of troughs.

According to another aspect, an internal combustion engine piston, comprising: a crown defining an annular cavity between an inner wall and an outer wall, the annular cavity including an opening opposite a top wall, wherein the inner wall, the outer wall, the top wall, and the annular cavity at least partially define a cooling gallery; and a cover plate is assembled with the inner and outer walls in the opening to form a lower boundary of the cooling gallery thereby enclosing the cooling gallery within the piston crown, wherein the cover plate is configured to form a variable volume profile of the cooling gallery.

In one embodiment, wherein the cover plate includes at least one aperture.

In one embodiment, wherein the cover plate includes a plurality of crests separated by a plurality of troughs wherein the crests and troughs are arranged to form the variable volume profile of the cooling gallery.

In one embodiment, wherein the plurality of crests and the plurality of troughs are arranged in a waved profile.

In one embodiment, wherein the plurality of crests and the plurality of troughs are arranged in a sawtooth profile.

In one embodiment, wherein each of the plurality of crests extends further into the annular cavity than each of the plurality of troughs.

In one embodiment, wherein the cover plate includes a sealing edge configured for engagement with the inner and outer walls of the piston crown.

In the above description, certain relative terms may be used such as “up,” “down,” “upper,” “lower,” “horizontal,” “vertical,” “left,” “right,” “proximal,” “distal,” and the like. These terms are used, where applicable, to provide some clarity of description when dealing with relative relationships. But, these terms are not intended to imply absolute relationships, positions, and/or orientations. For example, with respect to an object, an “upper” surface can become a “lower” surface simply by turning the object over. Nevertheless, it is still the same object.

Reference throughout this specification to “one embodiment,” “an embodiment,” or similar language means that a particular feature, structure, or characteristic described in connection with the embodiment is included in at least one embodiment of the present disclosure. Appearances of the phrases “in one embodiment,” “in an embodiment,” and similar language throughout this specification may, but do not necessarily, all refer to the same embodiment. Similarly, the use of the term “implementation” means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An internal combustion engine piston, comprising:

a crown having a piston axis and defining an annular cavity between an inner wall, an outer wall, and a top wall that extends between the inner and outer walls, the annular cavity including an opening opposite the top wall arranged such that the opening extends between a first end of the outer wall and a second end of the inner wall, wherein the inner wall, the outer wall, the top wall and the annular cavity at least partially define a cooling gallery, wherein the inner wall, the outer wall, and the top wall form an upper boundary of the cooling gallery, the upper boundary has a convex shape relative to the piston axis that extends between the first end of the outer wall and the second end of the inner wall; and a cover plate is assembled with the first end of the outer wall and the second end of the inner wall in the opening to form a lower boundary of the cooling gallery thereby enclosing the cooling gallery within the piston crown, the cover plate includes a plurality of crests separated by a plurality of troughs wherein the crests and troughs are arranged in a sinusoidal wave profile perpendicular to the piston axis to form a variable volume profile of the cooling gallery, wherein the plurality of troughs extend below and to the first and second ends of the outer and inner walls to increase the volume profile of the cooling gallery, wherein each of the plurality of crests has a convex shape and each of the plurality of troughs has a concave shape.

2. The piston of claim 1, wherein the cover plate includes at least one aperture.

3. The piston of claim 2, wherein the aperture is located on one of the plurality of crests.

4. The piston of claim 2, wherein the aperture is located on one of the plurality of troughs.

5. The piston of claim 1, wherein the variable volume profile of the cooling gallery is further defined by the plurality of crests that decreases the volume profile of the cooling gallery, wherein the plurality of crests extend above the first and second ends of the outer and inner walls.

6. The piston of claim 5, wherein each of the plurality of crests extends further into the annular cavity than each of the plurality of troughs.

7. The piston of claim 1, wherein the cover plate includes a sealing edge configured for engagement with the inner and outer walls of the piston crown.

8. An internal combustion engine piston, comprising:

a crown having a piston axis and defining an annular cavity between an inner wall, an outer wall, and a top wall that extends between the inner and outer walls, the annular cavity including an opening opposite the top wall arranged such that the opening extends between a first end of the outer wall and a second end of the inner wall, wherein the inner wall, the outer wall, the top wall, and the annular cavity at least partially define a cooling gallery, wherein the inner wall, the outer wall, and the top wall form an upper boundary of the cooling gallery, the upper boundary has a convex shape relative to the piston axis that extends between the first end of the outer wall and the second end of the inner wall; and a cover plate is assembled with the first end of the outer wall and the second end of the inner wall in the opening to form a lower boundary of the cooling gallery thereby enclosing the cooling gallery within the piston crown, wherein the cover plate includes a plurality of crests separated by a plurality of troughs wherein the crests and troughs are arranged in a sinusoidal wave profile perpendicular to the piston axis to form a variable volume profile of the cooling gallery, wherein the plurality of troughs extend to the first and second ends of the outer and inner walls to increase the volume profile of the cooling gallery, wherein the plurality of troughs extend below the first and second ends of the outer and inner walls, wherein each of the plurality of crests has a convex shape and each of the plurality of troughs has a concave shape.

9. The piston of claim 8, wherein the cover plate includes at least one aperture.

10. The piston of claim 8, wherein the variable volume profile of the cooling gallery is further defined by the plurality of crests that decreases the volume profile of the cooling gallery, wherein the plurality of crests extend above the first and second ends of the outer and inner walls.

11. The piston of claim 10, wherein each of the plurality of crests extends further into the annular cavity than each of the plurality of troughs.

12. The piston of claim 10, wherein the cover plate includes a sealing edge configured for engagement with the inner and outer walls of the piston crown.

* * * * *